United States Patent
Kubota

(10) Patent No.: US 8,027,120 B2
(45) Date of Patent: Sep. 27, 2011

(54) MAGNETIC TAPE DEVICE AND DATA RECORDING METHOD

(75) Inventor: Kenji Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 697 days.

(21) Appl. No.: 12/045,122

(22) Filed: Mar. 10, 2008

(65) Prior Publication Data

US 2008/0218893 A1 Sep. 11, 2008

(30) Foreign Application Priority Data

Mar. 8, 2007 (JP) ................................ 2007-058117

(51) Int. Cl.
  *G11B 5/584* (2006.01)
(52) U.S. Cl. ............ 360/77.12; 360/47; 360/53; 360/75
(58) Field of Classification Search ........................ None
  See application file for complete search history.

(56) References Cited

U.S. PATENT DOCUMENTS

| | | | | |
|---|---|---|---|---|
| 4,414,587 A | * | 11/1983 | Weaver et al. | 360/76 |
| 4,539,615 A | * | 9/1985 | Arai et al. | 360/121 |
| 5,138,499 A | * | 8/1992 | Tamegai | 360/13 |
| 5,369,652 A | * | 11/1994 | Bailey et al. | 714/755 |
| 5,912,780 A | * | 6/1999 | Yamada et al. | 360/64 |
| 6,134,384 A | * | 10/2000 | Okamoto et al. | 386/116 |
| 6,631,492 B2 | * | 10/2003 | Marchant | 714/764 |
| 2001/0013987 A1 | * | 8/2001 | Yanagawa et al. | 360/72.2 |
| 2002/0167747 A1 | * | 11/2002 | Saito et al. | 360/48 |
| 2004/0109256 A1 | * | 6/2004 | Honjo et al. | 360/73.07 |

FOREIGN PATENT DOCUMENTS

| | | |
|---|---|---|
| JP | 05282608 A | 10/1993 |
| JP | 8-249833 A | 9/1996 |
| JP | 2000067527 A | 3/2000 |
| JP | 2000099275 A | 4/2000 |

OTHER PUBLICATIONS

Japanese Office Action for JP2007-058117 issued Jul. 19, 2011.

* cited by examiner

*Primary Examiner* — Dismery Mercedes

(57) ABSTRACT

A magnetic tape device comprises a plurality of magnetic heads for recording or reproducing data to a magnetic tape including a data recording area, a tape running mechanism for making the magnetic tape run on the magnetic heads, and a controller for controlling a recording and reproducing operation of the magnetic heads for the magnetic tape while running. The controller includes a recording controller to control the recording and reproducing operation of the magnetic heads so as to record recording target data including a redundancy without recording the recording data and data which is the same as at least a part of the recording target data as redundant data, these data not being recorded in data recording areas adjacent with each other.

16 Claims, 17 Drawing Sheets

US 8,027,120 B2

MAGNETIC TAPE DEVICE AND DATA RECORDING METHOD

INCORPORATION BY REFERENCE

This application is based upon and claims the benefit of priority from Japanese patent application No. 2007-058117, field on Mar. 8, 2007, the disclosure of which is incorporated herein in its entirety by reference.

BACKGROUND OF THE INVENTION

1. Technical Field

This invention relates to magnetic tape devices and particularly to magnetic tape devices improving a reliability of data which are recorded on magnetic tapes.

2. Background Art

A magnetic tape device is a device for recording or reproducing data on a magnetic tape with magnetic head. The magnetic tape device is used for recording data which is managed in server computer as backup data. One of constitutions of the magnetic tape device is a helical scanning method. The helical scanning method is a method for arranging a plurality of magnetic heads around a head drum, and recording and reproducing data in track on tape by rotating the head drum and running the magnetic tape around the head drum as shown in FIG. 1 described below. Another constitution of the magnetic tape device is a linear recording method. There is provided a magnetic head assembly including a plurality of magnetic heads in the linear recording method. Then a device records or reproduces data in a running magnetic tape by moving the magnetic head assembly vertically with respect to a width of the magnetic tape as shown in FIG. 12 described below.

According to the magnetic tape device including a plurality of magnetic heads described above, there is a problem of failing in processing of reading data. More specifically, if a problem occurs in a part of magnetic heads or the data cannot be read partially due to a dirt or a scratch on the tape, the processing can be failed even if remaining data can be read normally. That is, there is a problem that reliability of a conventional magnetic tape device is lacked because the data cannot be read in case that one of a plurality of magnetic heads crashes or a dirt is attached to a part of the tape although the device includes a plurality of magnetic heads.

As the art for resolving the problem, Japanese Unexamined Patent Application Publication No. 5-282608 (Koyama) discloses the magnetic tape device including a plurality of magnetic heads which records data and duplicated data in adjacent tracks on a magnetic tape simultaneously. The magnetic tape device gives the recording data redundancy by recording the duplicated data.

However in the art of Koyama, data and duplicated data having redundancy are recorded in the adjacent tracks. Therefore, both data cannot be read in case that an error in reading is occurred by a dirt or a scratch in adjacent data areas on the magnetic tape. Then there is raised a problem that the reliability cannot be improved. Further there is also a problem that amount of data capacity is enormous because a copy of recording target data is recorded in addition to the original data.

SUMMARY

An exemplary object of the invention is to provide a magnetic tape device improving the reliability of the recorded data. Another exemplary object of the invention is to provide a magnetic tape device where data recording capacity is restrained and the reliability is improved.

A magnetic tape device according to an exemplary aspect of the invention includes a plurality of magnetic heads for recording or reproducing data in a magnetic tape including a data recording area, a tape running mechanism for making the magnetic tape run on the magnetic heads, and a controller for generating data for recording, the data have redundancy from recording target data and recording the data for recording in the data recording area.

A data recording method for a magnetic tape device including a plurality of magnetic heads for recording or reproducing data in a magnetic tape including a data recording area, a tape running mechanism for making the magnetic tape run on the magnetic heads, and a controller for controlling an recording and reproducing operation of the magnetic heads for the magnetic tape while running, the method according to an exemplary aspect of the invention includes controlling the recording operation of the magnetic heads so as to record recording target data and data which is the same as at least a part of the recording target data as redundant data, these data not being recorded in data recording areas adjacent with each other.

BRIEF DESCRIPTION OF THE DRAWINGS

The above and other objects, advantages and features of the present invention will be more apparent from the following description of certain preferred embodiments taken in conjunction with the accompanying drawings, in which.

EXEMPLARY EMBODIMENT

The invention will now be described herein with reference to illustrative exemplary embodiments. Those skilled in the art will recognize that many alternative exemplary embodiments can be accomplished using the teachings of the present invention and that the invention is not limited to the exemplary embodiments illustrated for explanatory purposes.

According to the exemplary embodiment, the recording controller records the recording target data and data which is the dame as at least a part of the recording target data as redundant data, these data not being recorded in data recording areas adjacent with each other. This embodiment is the one in which the present invention is applied to a magnetic tape device of a helical scanning type and a linear recording type.

First Exemplary Embodiment

Figure 7:
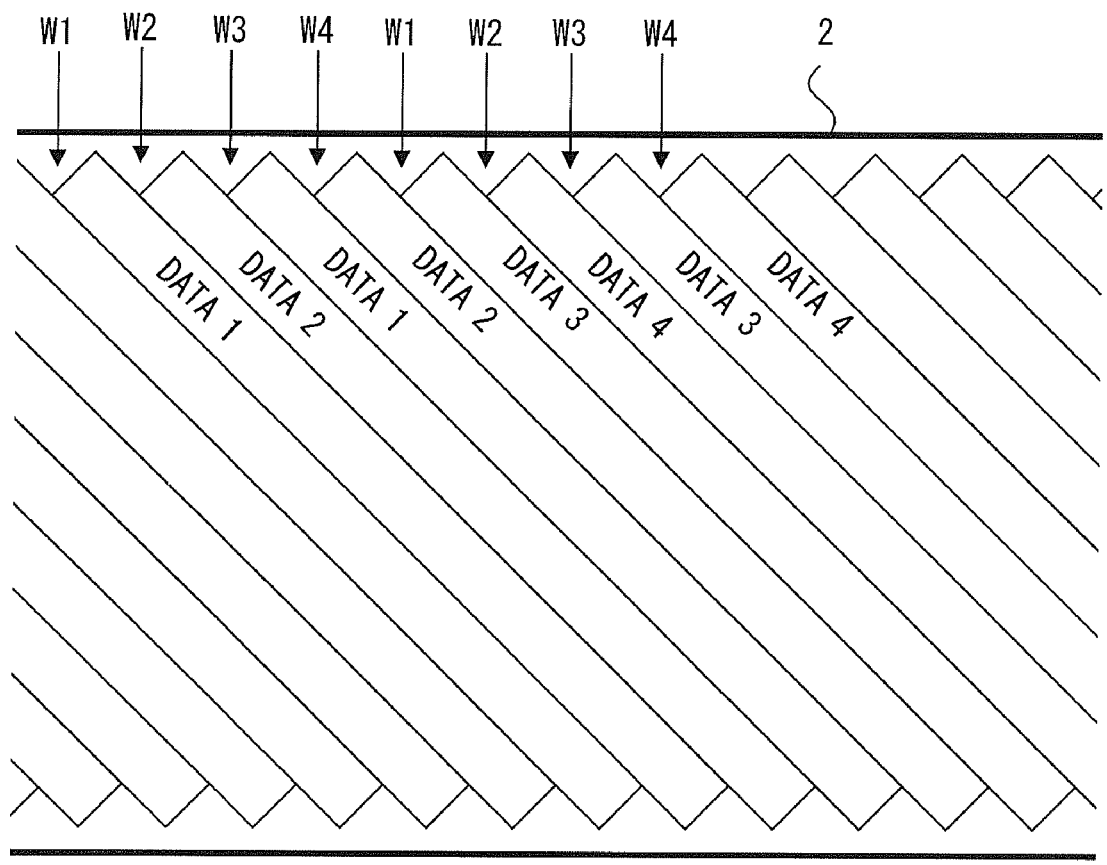
FIG. 7 is a diagram for showing a data track of the magnetic tape device, and showing a condition to record data with redundancy of the first embodiment.
Figure 8:
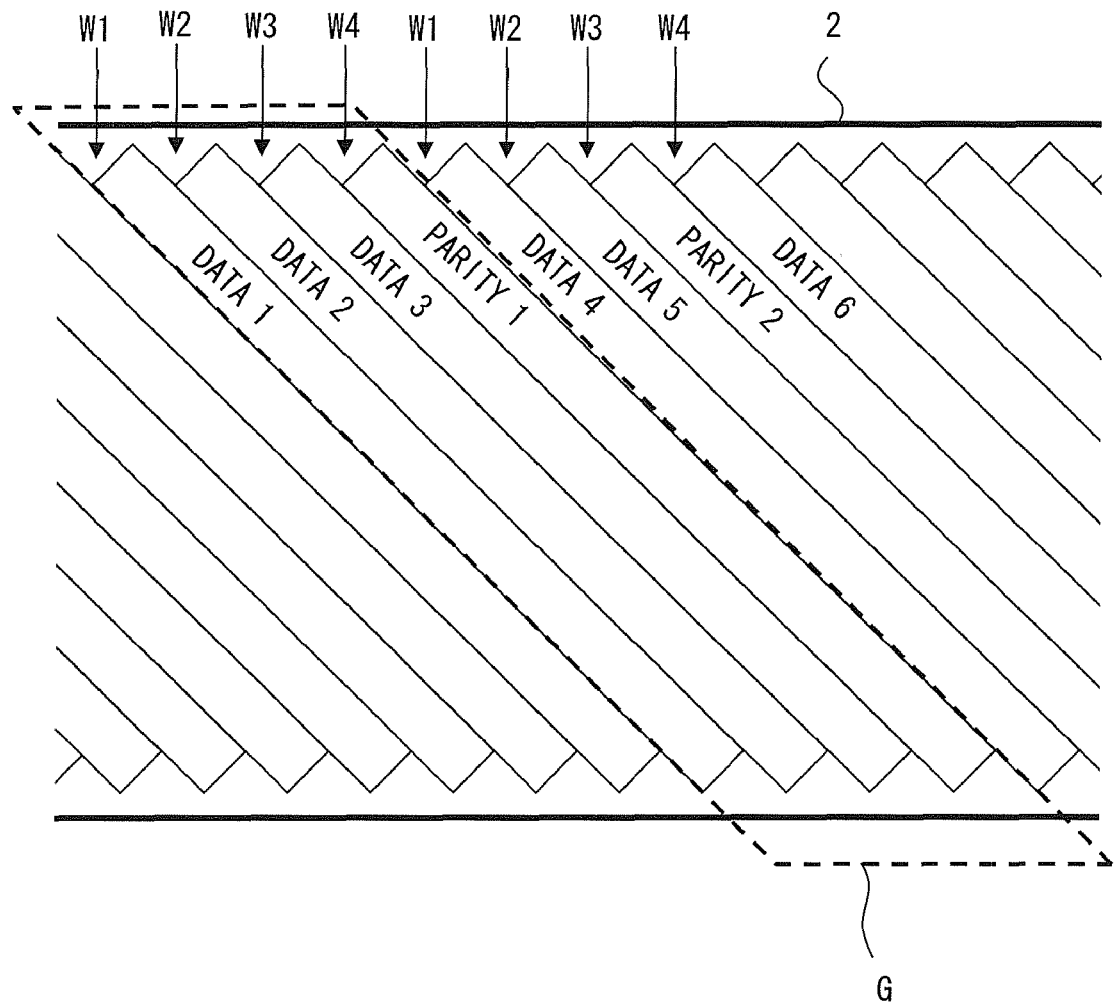
FIG. 8 is a diagram for showing a data track of the magnetic tape device, and showing a condition to record data with redundancy of the first embodiment.
Figure 9:
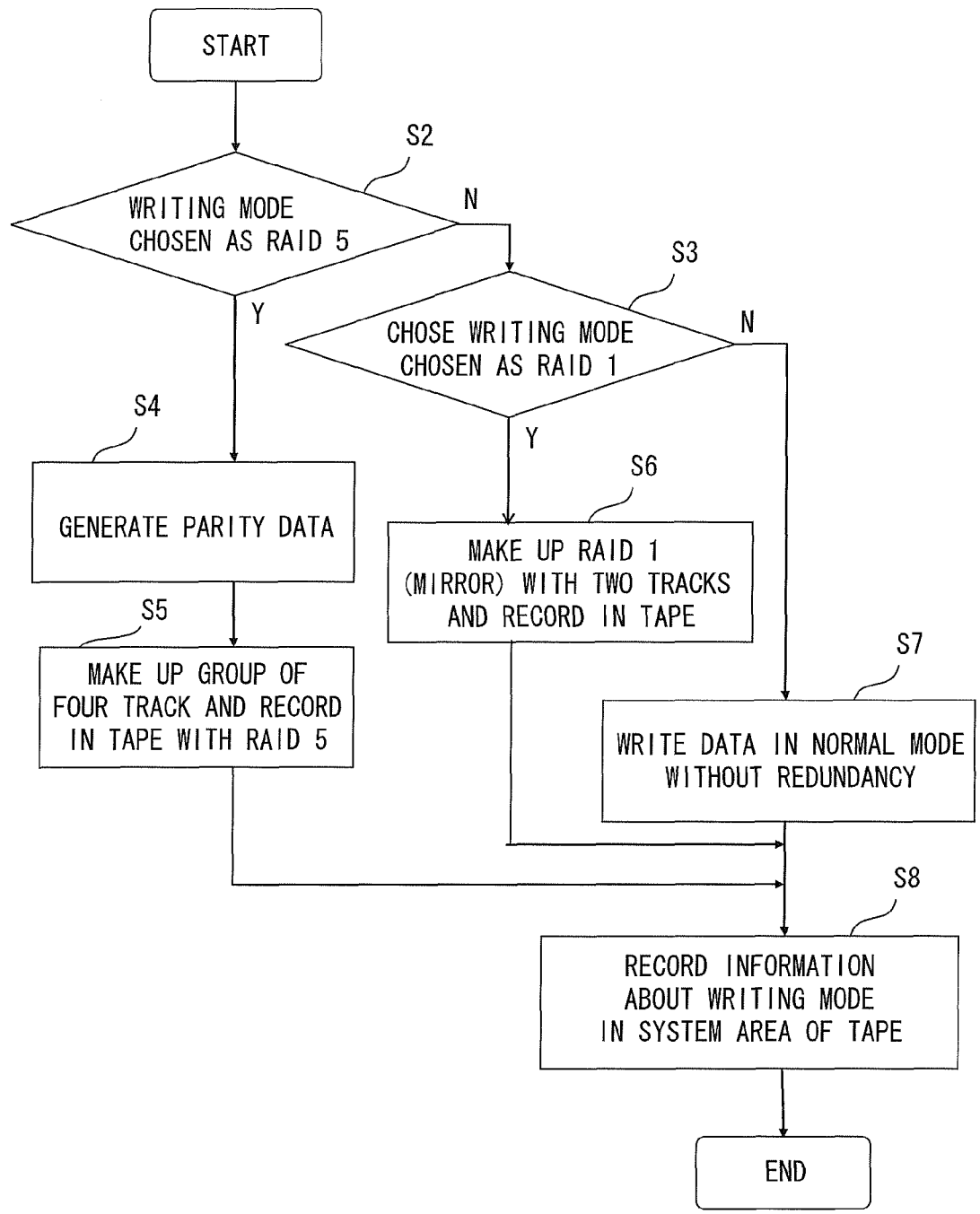
FIG. 9 is a flow chart for showing an operation of the data recording of the magnetic tape device of the first embodiment.
Figure 10:
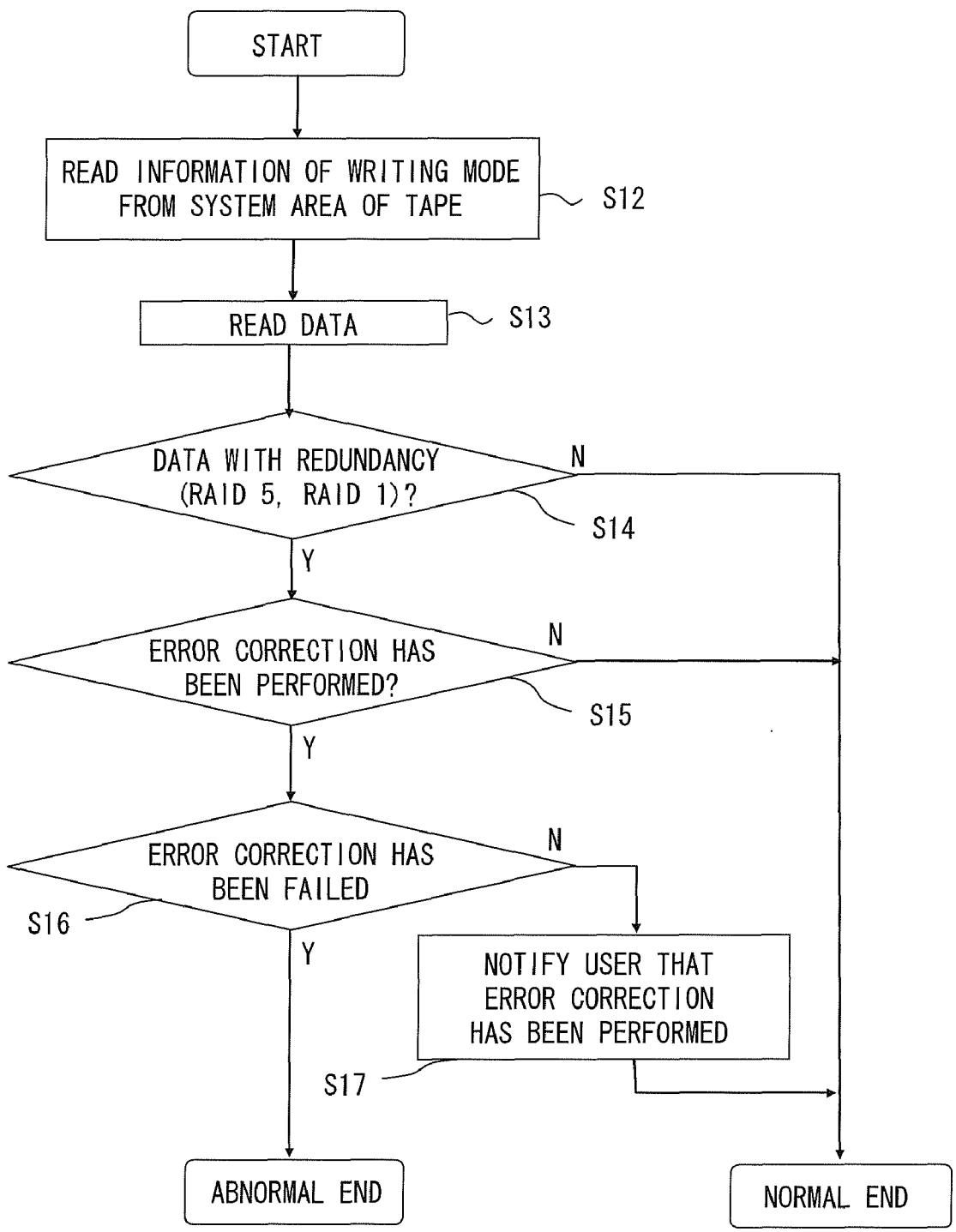
FIG. 10 is a flow chart showing an operation of the data reproducing of the magnetic tape device of the first embodiment.
Figure 11:
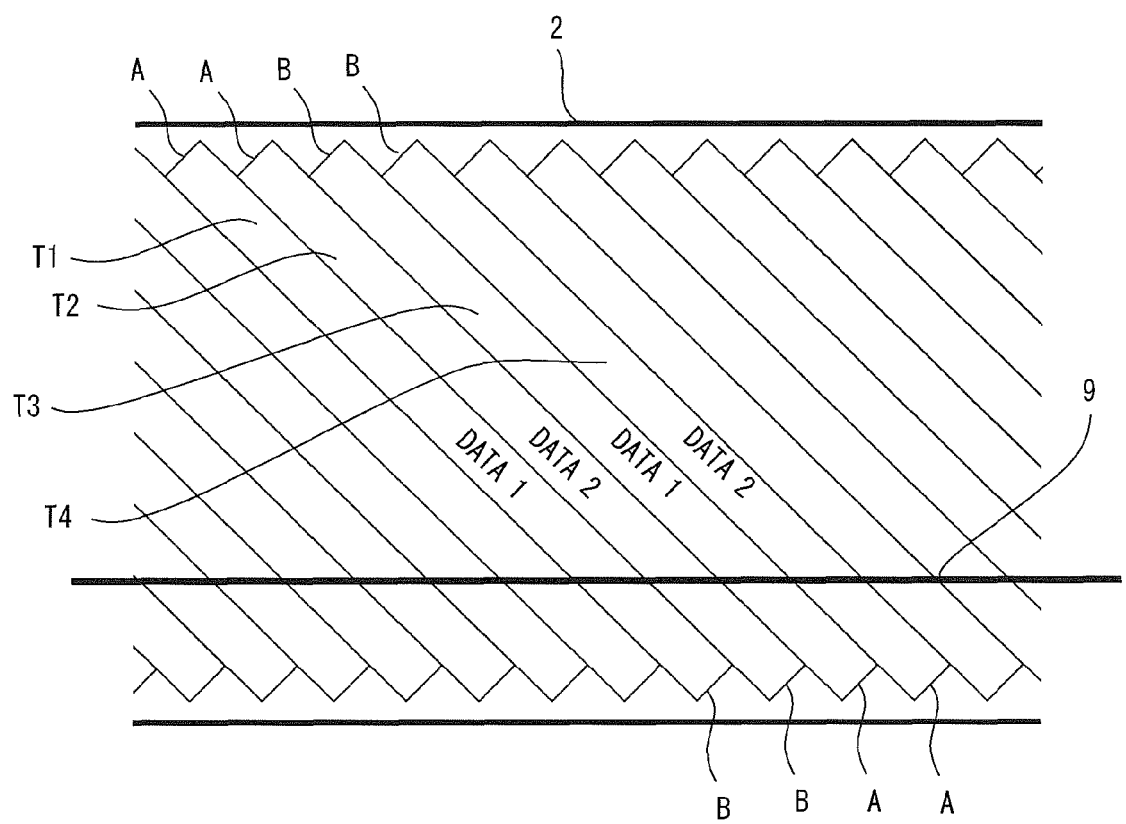
FIG. 11 is a diagram for showing a data track of the magnetic tape device, and showing a condition to record data with redundancy of the first embodiment.

A first exemplary embodiment to which the present invention is applied will now be described in detail below with reference to FIGS. 1-11. FIGS. 1-4 are diagrams showing a constitution of a magnetic tape device. FIGS. 5-8 are diagrams showing a data recording method on a magnetic tape. FIGS. 9-10 are flowcharts showing an operation of the magnetic tape device. FIG. 11 is diagram showing a modified exemplary embodiment of the data recording method on the magnetic tape.

[Constitution]

Figure 1:
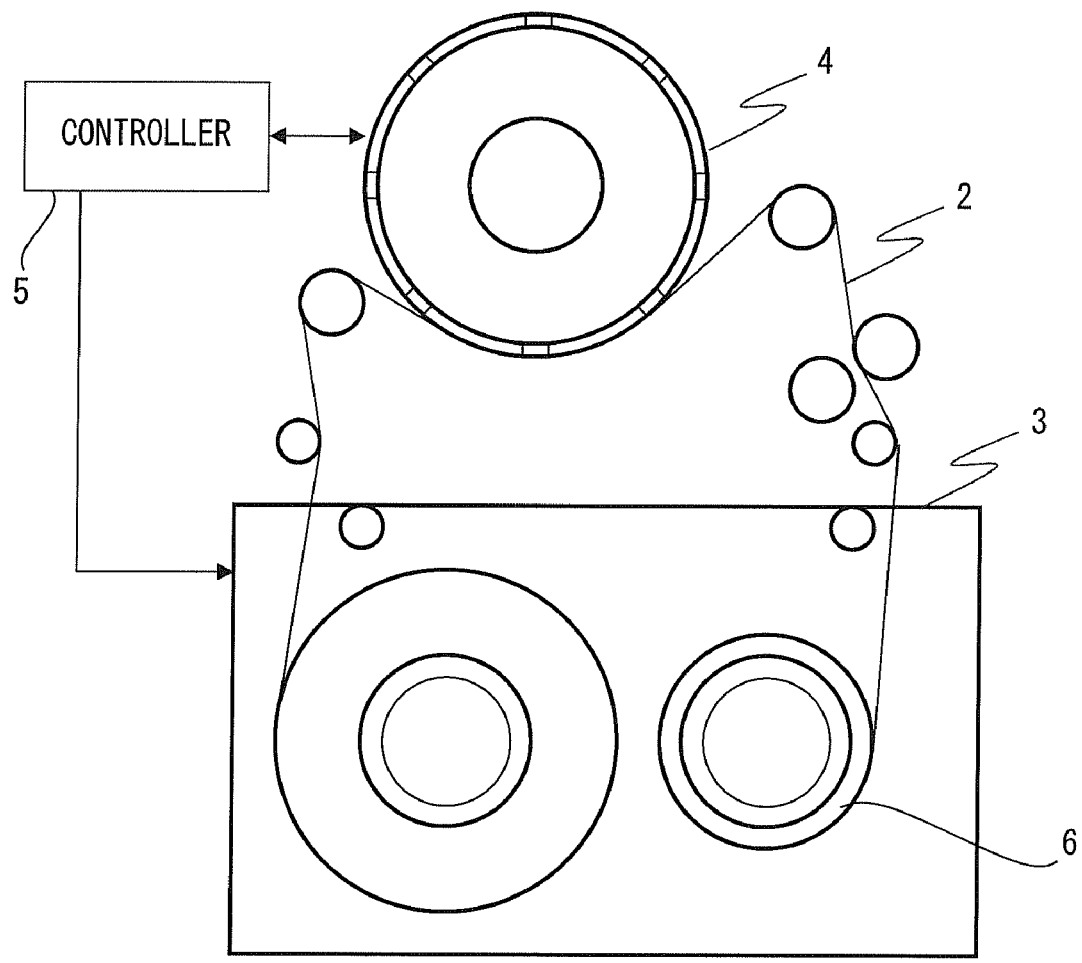
FIG. 1 is a diagram for showing a constitution of a magnetic tape device of a first embodiment with a helical scanning method.
Figure 2:
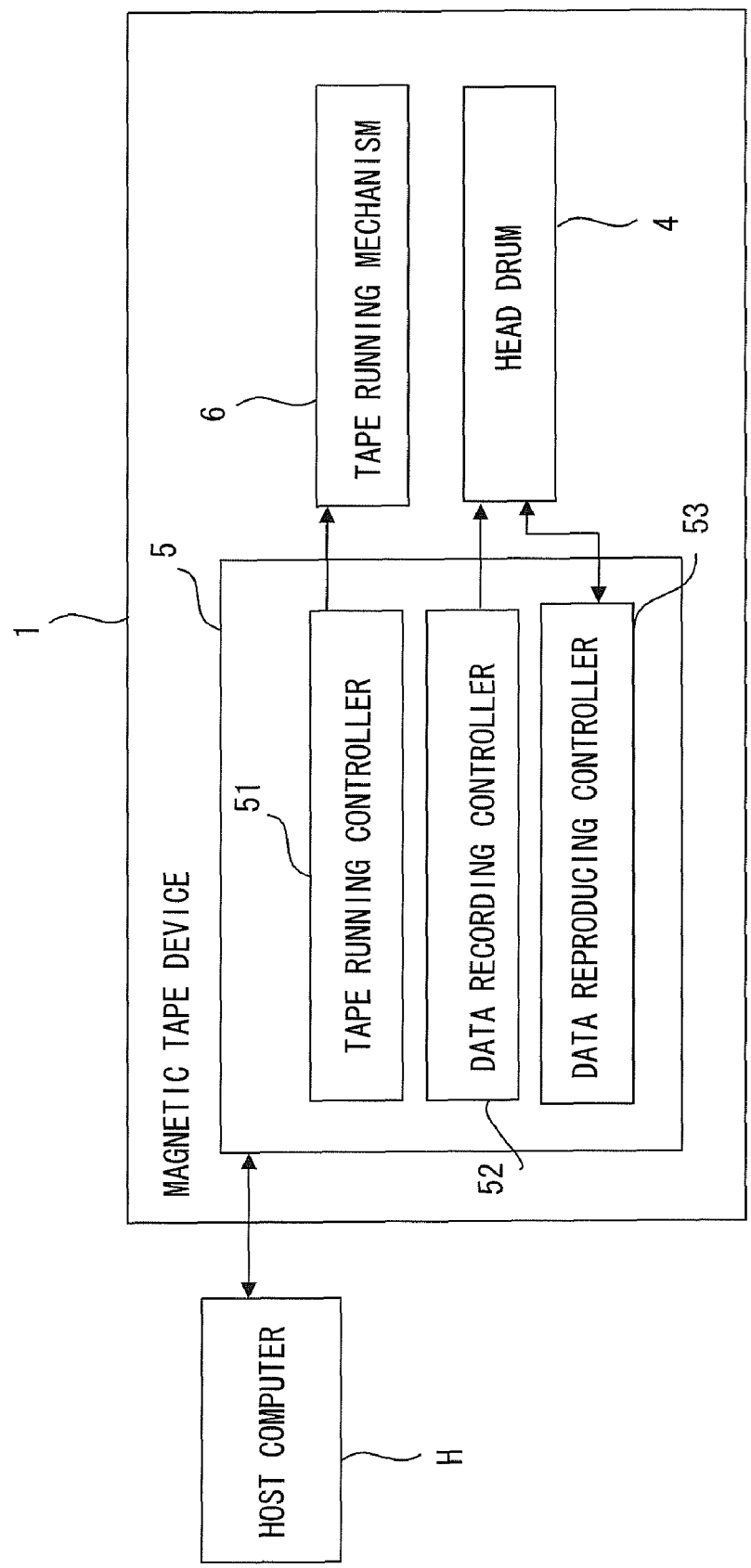
FIG. 2 is a block diagram for showing the magnetic tape device of the first embodiment.

A magnetic tape device 1 of the exemplary embodiment is a magnetic tape device of the helical scanning type (hereinafter referred to as a helical-type magnetic tape device). As shown in FIG. 1, the helical-type magnetic tape device 1 loads a cartridge 3 holding a magnetic tape 2 having tracks which are data recording areas. The magnetic tape device 1 includes a head drum 4 having a plurality of magnetic heads which write and read data to and from the magnetic tape 2, a tape running mechanism 6 running the magnetic tape 2 around the head drum 4, and a controller 5 (means for controlling) controlling a read or a write data operation of the magnetic head.

Figure 3:
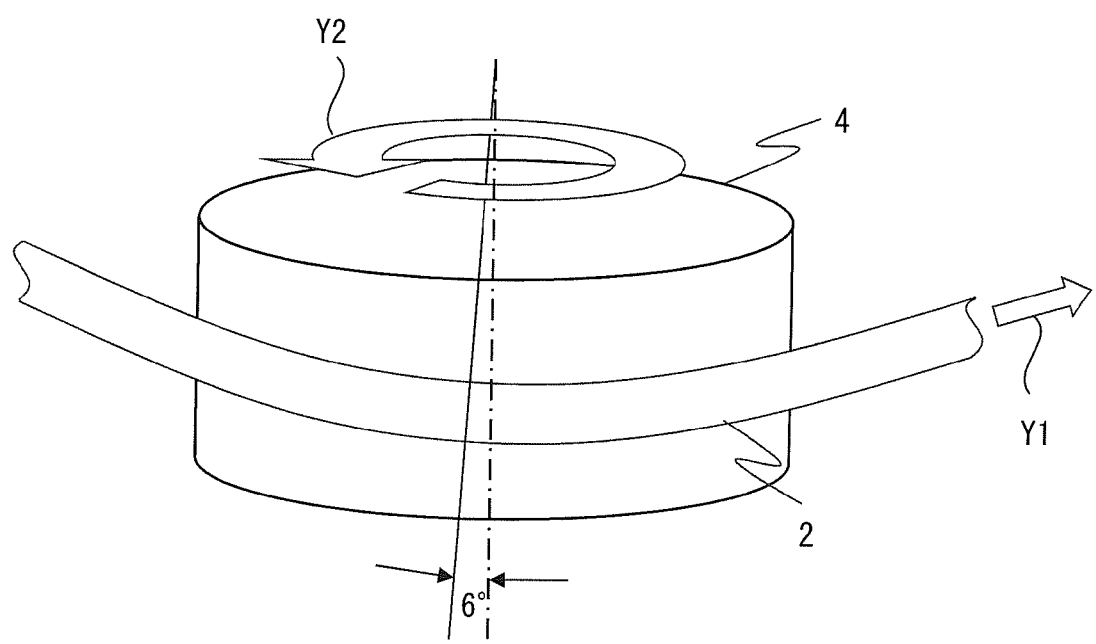
FIG. 3 is a view for showing a positional relationship between a head drum and a magnetic tape of the magnetic tape device of the first embodiment.
Figure 4:
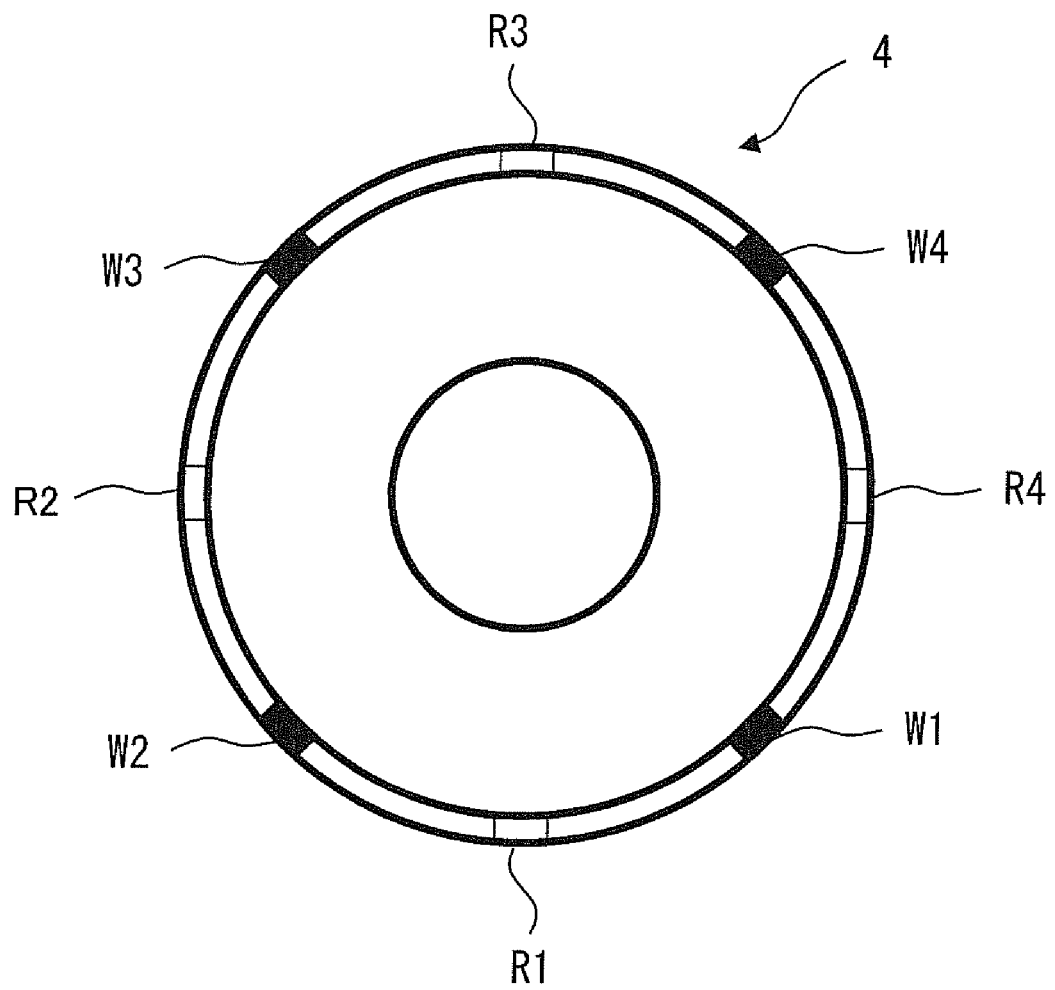
FIG. 4 is a view for showing a constitution of the head drum of the first embodiment.

Specifically, as shown FIG. 3, in the helical-type magnetic tape device 1, an axis of the head drum 4 is inclined toward running direction of the magnetic tape 2 (for example 6 degrees) ,and the head drum 4 is configured rotatably in the direction of arrow Y2. As shown FIG. 4, four write heads W1-W4 and four read heads R1-R4 are disposed alternately and equiangularly around the head drum 4. Note that, the number of each head can be any.

The controller 5 of the helical-type magnetic tape device 1 includes a tape running controller 51, a data recording controller 52, and a data reproducing controller 53 by loading a predetermined program. The tape running controller 51 controls rotation of the tape running mechanism 6 and controls a tape running operation. The data recording controller 52 controls an operation of the head drum 4 by indication from the host computer H and records data to be recorded. The data reproducing controller 53 controls an operation of the head drum 4 and reads data recorded in the magnetic tape 2.

Figure 5:
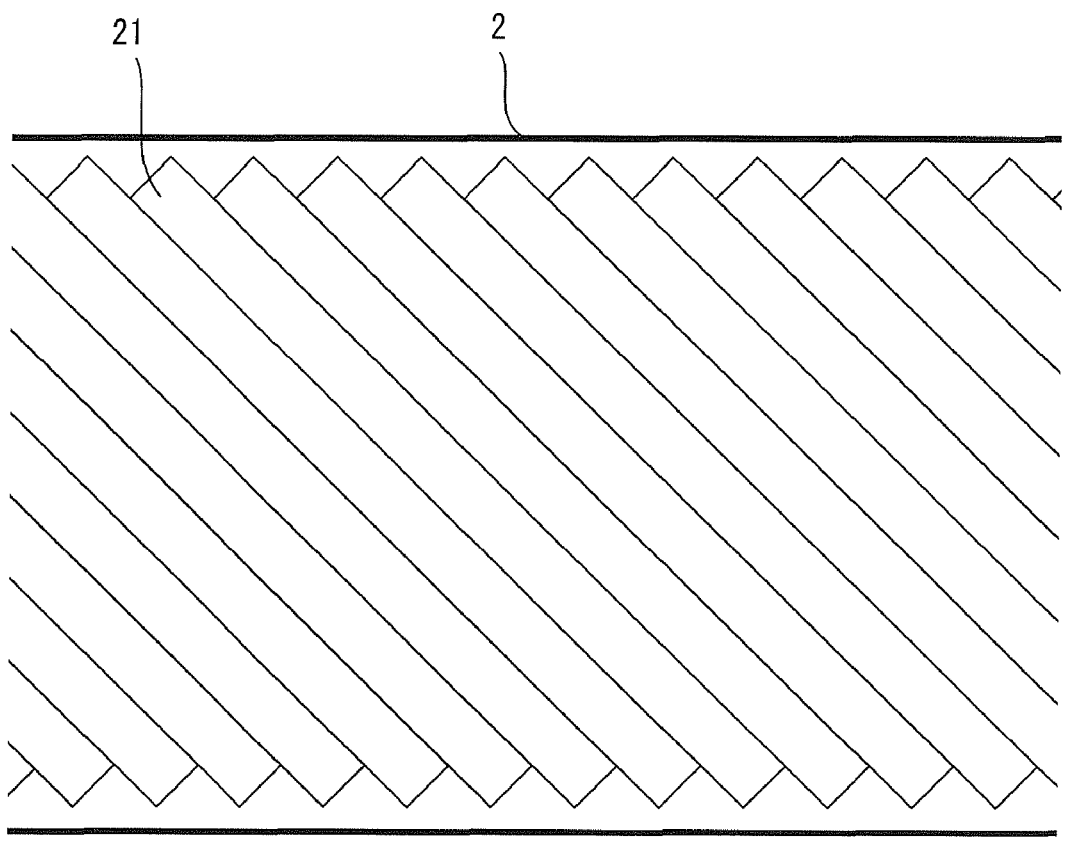
FIG. 5 is a diagram for showing a data track of the magnetic tape device of the first embodiment.

Specifically, the data recording method realized by the data recording controller 52 is specified in the exemplary embodiment. Therefore the data recording method will now be described. As shown by FIG. 5, the data tracks 21 of the magnetic tape 2 are not formed vertically but obliquely formed with respect to the running direction. In a conventional data writing method, different recording target data is recorded in each track 21 by the four write heads W1-W4 formed in the head drum 4. Therefore, in the conventional method of writing data, there is no redundancy in the recorded data (see FIG. 6).

On the other hand, this exemplary embodiment can control the operation of the head drum 4 by the data recording controller 52 to record a recording data which is the same as at least a part of the recording target data in a same way as in RAID 1 which is a method for recording data in hard disk. At this time, the data recording controller 52 controls the write heads so as to record each of the recording target data and the same data in tracks with having another truck interposed therebetween, but without recording the same data in the adjacent tracks. As an example, as shown in FIG. 7, the write head W1 writes data 1 in prescribed track at first, and then the write head W2 writes data 2 which is different from the data 1 in an adjacent track. Further, the write head W3 writes the data 1 which is same as the data 1 in further adjacent track, and then the write head W4 writes the data 2 which is same as the data 2 in further adjacent track. As mentioned above, for example, because the data 1 is recorded in pair track with having one track interpose therebetween. Therefore even if one track of the pair track which records the data 1 cannot read the data, the data can be restored by function of the data reproducing controller 53 described below. In addition, since this data recording order is not fixed, one of the pair data 1 can be recorded in another separated track. There is also redundancy in other data 2, 3, and 4 in the same way.

Further, the data recording controller 52 has a function for recording data in another recording method. For example, the data recording controller 52 generates a plurality of divided data obtained by dividing the recording target data and parity data which detects an error of the recording target data in the same way as in RAID 5 which is a method for recording data in hard disk, and controls an operation of the head drum 4 to record the data arranged in group with each divided data and parity data. That is, the data recording controller 52 generates the parity data as a redundant data of the recording target data and records the parity data on the track. As an example, the data recording controller 52 divides the recording target data into data 1, 2, and 3 and generates their parity data. Then, as shown FIG. 8, the data 1 which is the divided data is recorded in a prescribed track by the write head W1 and the write head W2 records the data 2 in a next track. The write head W3 records the data 3 which is the divided data in the next track, and then the write head W4 records the parity data in the next track. As stated, four data including the data 1, 2, 3 and the parity data form a group, and the group is recorded in tracks. Therefore, even if one track of the group is defective track, the data is restored by a function of the data reproducing controller 53 described below and the redundancy is kept. Further the data recording capacity can be restrained. In the above example, we have explained four tracks including the parity data form one group because the four write heads W1-W4 are provided. But the group may include five or more tracks or one group may include a plurality of parity data.

The data reproducing controller 53 controls the read heads R1-R4 so as to read the data which is recorded in each track on the magnetic tape 2 as described above. At this time, if the error is detected in reading, error correction is performed based on the set writing method. For example, as shown in FIG. 7, in the RAID 1 method, when data cannot be read from a part of tracks, the data is restored by the same data which makes pair in another track. Further, as shown in FIG. 8, in the RAID 5 method, when the data cannot be read from a part of tracks, the data is restored by the other data (including the parity data) of the same group. Then it is informed the host computer H that the error correction is performed, if necessary.

[Operation]

The operation of the magnetic tape device 1 which has above-described constitution will be hereinafter described with reference to flow charts of FIGS. 9-10. Firstly, the writing operation will be described with reference to FIG. 9.

Initially, a writing mode is set in the magnetic tape device 1 based on an initial setting or an order from the host computer H. When data writing is started (step S1), the magnetic tape device 1 checks which writing mode is set by a specified setting by user or the host computer H or the initial setting (step S2).

Figure 6:
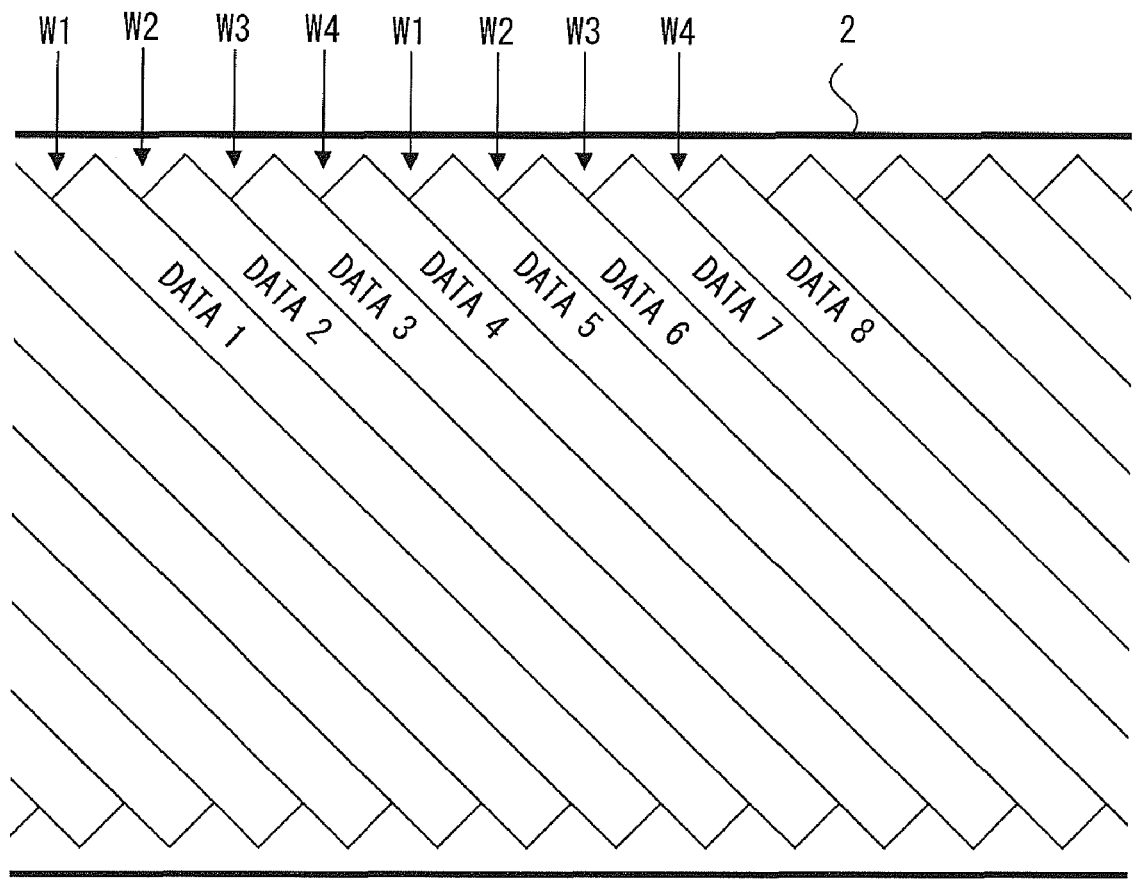
FIG. 6 is a diagram for showing a data track of the magnetic tape device, and showing a condition to record data normally of the first embodiment.

Then, in the case where the writing mode is to set RAID 5 (step S2: Yes), the magnetic tape device 1 divides the recording target data and generates the parity data (step S4), and as shown in FIG. 8, one group formed by four tracks is recorded in the magnetic tape 2 (step S5, recording controlling step). On the other hand, when the writing mode is set to RAID 1 described above (step S2: No, step S3: Yes), as shown in FIG. 7, the mirror of the recording target data formed by two tracks that are separated with each other is recorded in the magnetic tape 2 (step S6, recording controlling step). In addition, if a redundancy mode is not set (step S3: No), as shown in FIG. 6, the magnetic tape device 1 records data with normal mode (step S7). Subsequently, the magnetic tape device 1 records information of a mode (no redundancy; RAID 1; RAID 5) when the data is recorded as described above in a system area of the magnetic tape 2 (step S8), and a writing operation is finished (step S9).

Second, a reading operation will be described with reference to FIG. 10. Firstly, when the reading operation is started (step S11), the information of the writing mode which is written in the system area of the magnetic tape 2 is read (step S12). Then a data reading is performed (step S13), and when the data is recorded in normal mode (step S14: No), the operation is finished normally (step S19).

On the other hand, in the case where the data is recorded with redundancy (RAID 1, RAID 5) (steps 14: Yes), if the data can be read normally without performing error correction (step S15, No) as a result of reading, the operation is finished normally (step S19) . When the error correction is performed (step S15: Yes) and the error correction is completed (step S16: No), it is informed the user that the error correction is completed (step S17) and the operation is finished normally (step S19). When the error correction is performed and failed to correct errors (step S16: Yes), the operation is finished abnormally (step S18). When it is informed the user that the error correction was performed in step S17, the user can recognize problems such as dirty head, cleaning request, tape lifetime being lost (change request), and the user can promptly deal with the problem.

Here, in step S15, as described above, the error correction is performed in response to each recording mode (RAID 1, RAID 5). If the data was recorded in RAID 1 shown in FIG. 7, the same data are recorded in two parts. Therefore, even if one of the data cannot be read, the data can be restored. Particularly, in the example of the RAID 1, if there is a problem in the magnetic tape 2 and two consecutive tracks cannot be read, the data can be restored because same data are recorded in the places which are physically separated. When the data was recorded in RAID 5 shown in FIG. 8, the data can also be restored even if one track cannot be read in the group. Therefore, in the magnetic tape device 1, the data are recorded in redundancy, data recording capacity can be restrained, and data reliability can be improved with low cost.

According to the first exemplary embodiment, the recording controller records the recording target data and data which is the dame as at least a part of the recording target data as redundant data, these data not being recorded in data recording areas adjacent with each other. For example, the recording target data and the redundant data are recorded in different tracks. Therefore a magnetic tape device can improve reliability of the recording target data.

The recording controller controls the recording operation so as to record the recording target data and the redundant data giving the recording target data redundancy in different tracks on the magnetic tape. The redundant data is the same as the recording target data. Further the recording controller records the redundant data in a direction opposite to a recording direction of the recording target data on the magnetic tape. Furthermore the recording controller records the recording target data and the redundant data in each track spaced apart with each other on the magnetic tape.

Therefore, the recording target data is recorded with redundancy on the magnetic tape with RAID (Redundant Arrays of Inexpensive Disks) 1 method which is a writing method of Hard disk (HDD) in order to record same data as the recording target data. Specifically, by recording the redundant data in a direction opposite to a recording direction of the recording target data or recording the recording target data and the redundant data in each track spaced apart with each other, even if a part of data on the magnetic tape is damaged, the data can be restored and a magnetic tape device can improve reliability.

According to the magnetic tape device of the first exemplary embodiment, the redundant data is parity data to detect an error of the recording target data. Further the recording controller records divided data of the recording target data and the parity data of the recording target data as one group in each truck. So, since the recording target data is recorded in the magnetic tape with RAID 5 which is a writing method of HDD, a magnetic tape device can keep the reliability and improve using efficiency of a memory capacity.

Note that, the above magnetic tape device records or reproduces data in the magnetic tape with helical scanning method or linear recording method, for example.

Modified Exemplary Embodiment

A modified exemplary embodiment of a data recording method of the magnetic tape device 1 described above will now be described with reference to FIG. 11. The modified exemplary embodiment is another exemplary embodiment of the data recording method of the data recording controller 52 of the magnetic tape device 1.

In this modified exemplary embodiment, basically, the data recording controller 52 records data such as in RAID 1. However the data recording controller 52 records each data of a pair of data in different directions. More specially, in an example of FIG. 11, data 1 is recorded in a track 1 (T1) from top side of data A to end side of data B. On the other hand, in track 3 (T3) away from track 1, data 1 is recorded in a direction which is opposite from recording direction of track 1. Thus, the data is recorded so that a top of data A and an end of data B of the track 1 and a top of data A and an end of data B of the track 3 are placed in different directions with each other. The data 2 is also recorded similarly.

Thus, for example, as shown in FIG. 11, even if a linear dirt or scratch is generated in tape running direction (see reference symbol 9), because a pair of data (track 1 (T1) and track 3 (T3)) is recorded with their array inverted with each other, it can be effectively prevented that the pair data loses same place of the data array. Therefore, even in such a case, the data can be restored and reliability can be improved.

In addition, in an example of FIG. 11, the case where a mirror data which is the same as the data 1 of track 1 (T1) is recorded in track 3 (T3) is explained with an example. But the mirror data can be recorded before the track 1 (T1).

Second Exemplary Embodiment

Figure 15:
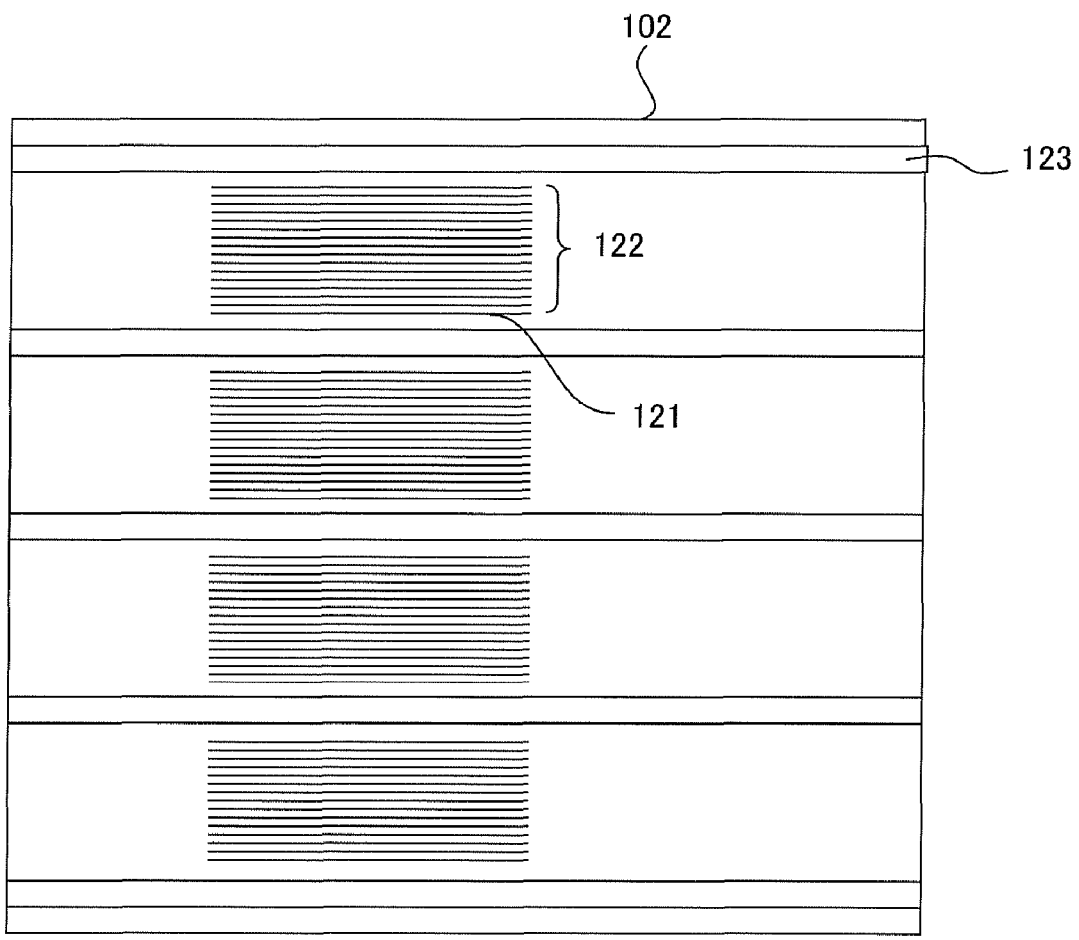
FIG. 15 is a view for showing a data track of the magnetic tape of the second embodiment.
Figure 16:
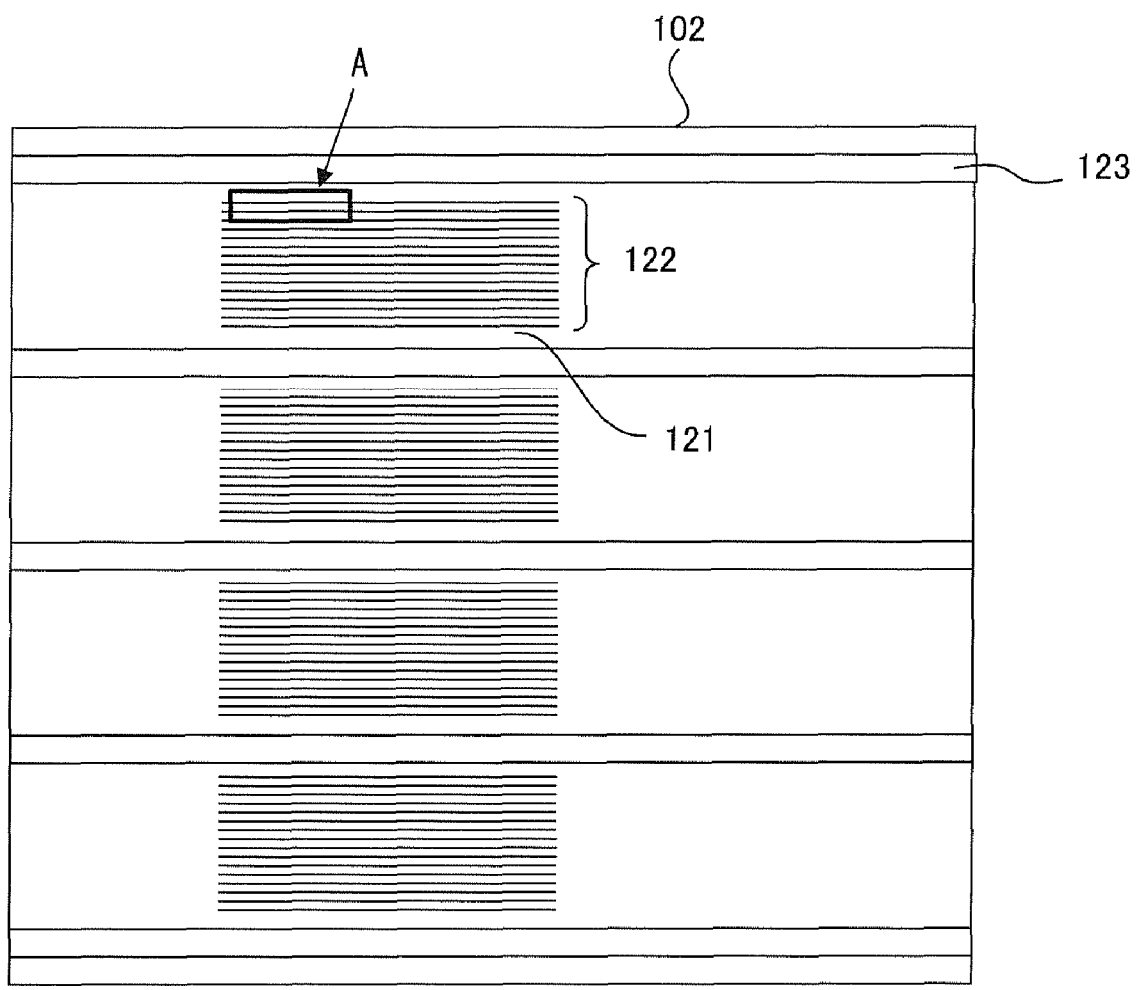
FIG. 16 is a view for showing a data track of the magnetic tape of the second embodiment.
Figure 17:
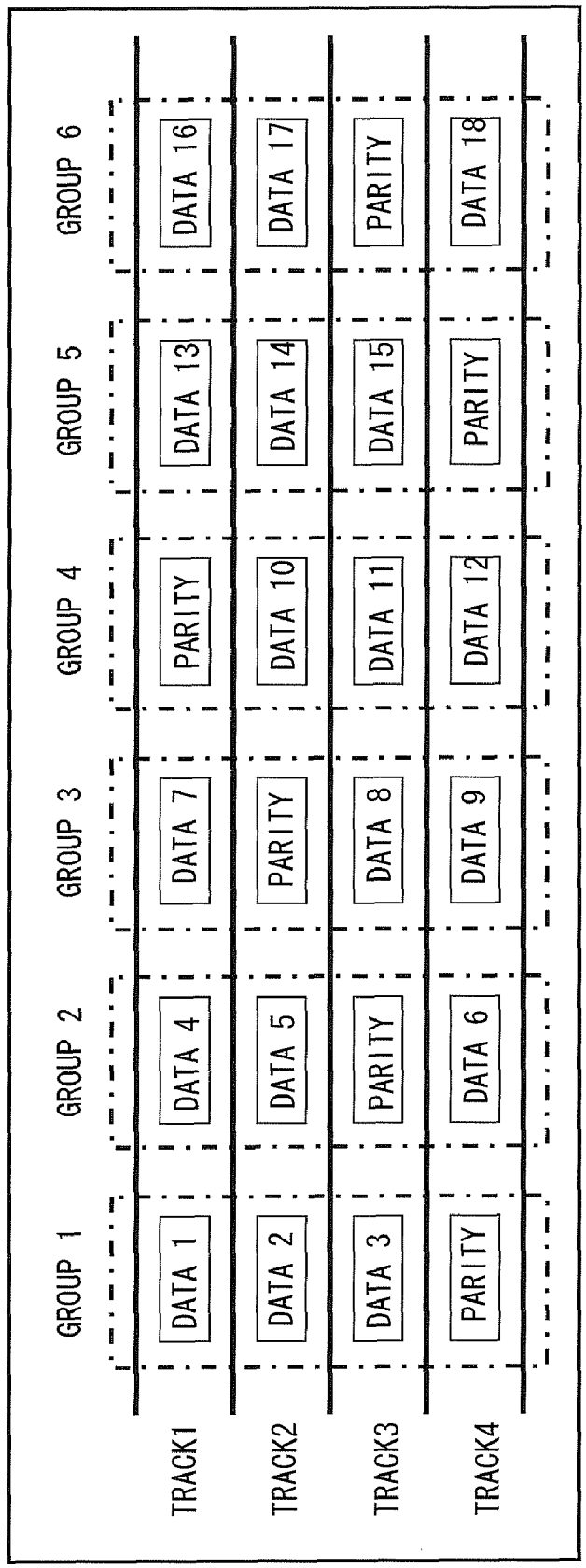
FIG. 17 is an enlarged view showing a data track of the magnetic tape of the second embodiment, and showing a condition to record data with redundancy.

A second exemplary embodiment to which the present invention is applied will now be described in detail below with reference to FIGS. 12-17. FIGS. 12-17 are diagrams showing a constitution of a magnetic tape device of this exemplary embodiment. FIGS. 15-17 are diagrams showing a data recording method of a magnetic tape.

Figure 12:
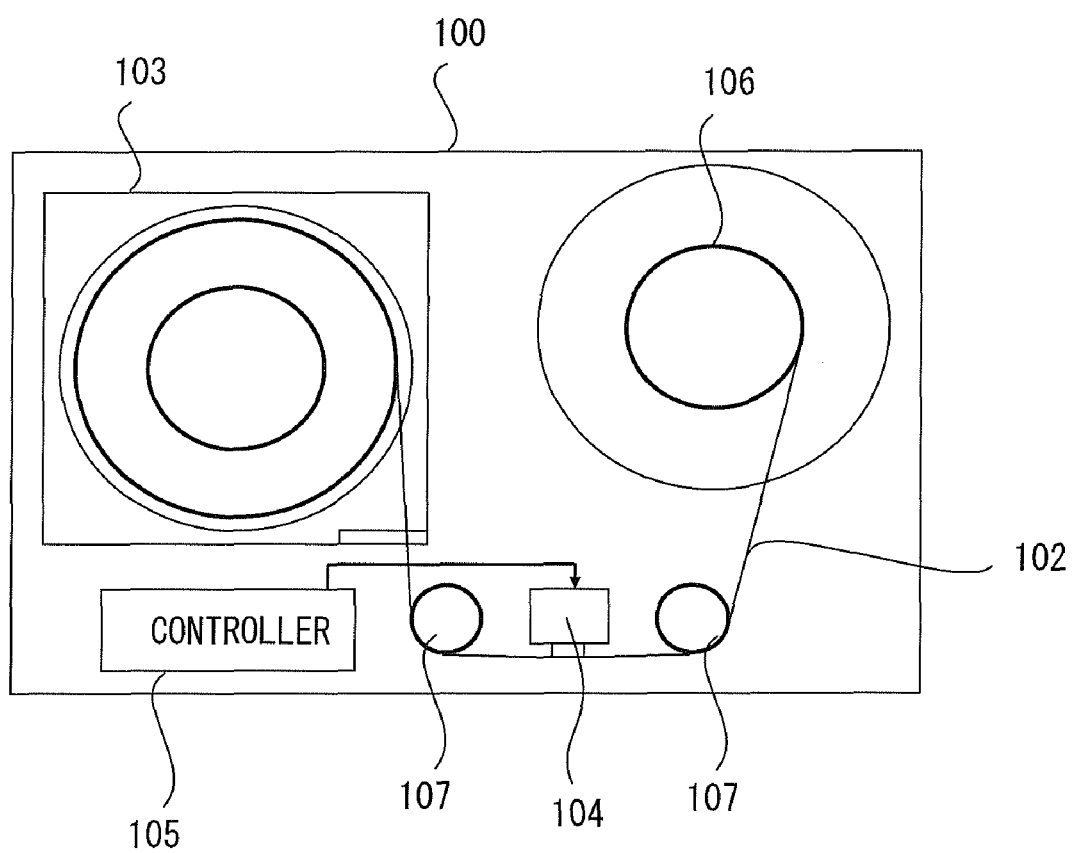
FIG. 12 is a diagram for showing a constitution of a magnetic tape device of a second embodiment with a linear recording method.
Figure 13:
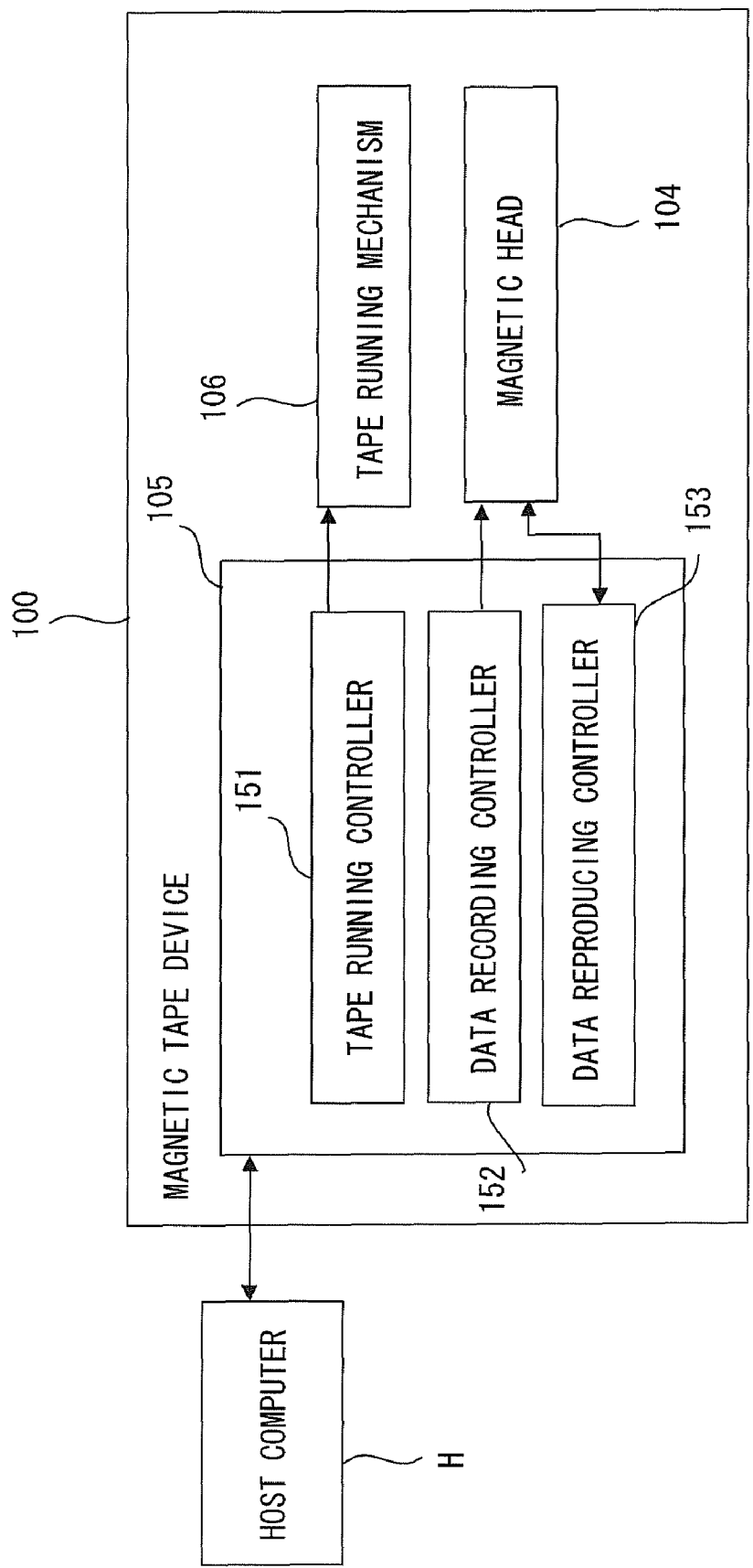
FIG. 13 is a block diagram for showing the magnetic tape device of the second embodiment.

A magnetic tape device 100 of this exemplary embodiment is a magnetic tape device of a linear recording type (fixed head type) (hereinafter referred to as a linear-type magnetic tape device). As shown in FIG. 12, the linear-type magnetic tape device 100 loads a cartridge 103 holding a magnetic tape 102 having tracks which are data recording areas. The magnetic tape device 100 includes a magnetic head assembly 104 having a plurality of magnetic heads which write and read data to and from the magnetic tape 102, a tape running mechanism 106 and a guide roller 107 running the magnetic tape 102 toward the magnetic heads, and a controller 105 (means for controlling) controlling read or write operation of the magnetic head in the running magnetic tape 102.

Figure 14:
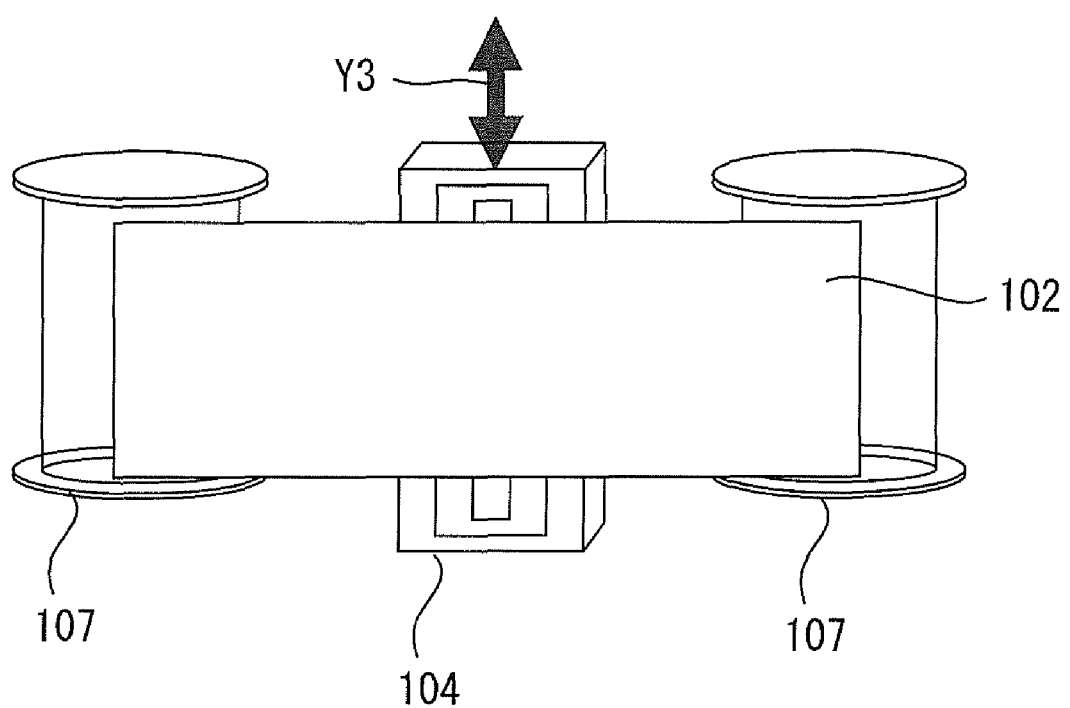
FIG. 14 is a view for showing a positional relationship between a magnetic head assembly and a magnetic tape of the magnetic tape device of the second embodiment.

Specifically, as shown in FIG. 14, in the linear-type magnetic tape device 100, the magnetic tape 102 is arranged opposite to the magnetic head equipment position of the magnetic head assembly 104 by the guide roller 107. The magnetic head assembly 104 is adapted to be movable in the direction which is perpendicular to the running direction of the magnetic tape 102, as shown in an arrow Y3, that is a width direction of the magnetic tape 102. The magnetic head assembly 104 can record or reproduce the data in the magnetic tape 102 which is running with proceeding and returning. Note that, because the magnetic head assembly 104 includes a plurality of magnetic heads, the magnetic head assembly 104 can record a plurality of tracks at the same time. For example, the magnetic head assembly 104 has 8-16 write heads and read heads, respectively.

The controller 105 of the magnetic tape device 100 includes a tape running controller 151, a data recording controller 152, and a data reproducing controller 153 by loading a predetermined program. The tape running controller 151 controls rotation of the tape running mechanism 106 and controls a tape running operation. The data recording controller 152 (means for controlling recording) controls an operation of the magnetic head (the magnetic head assembly 104) by indication from the host computer H and records data to be recorded. The data reproducing controller 153 controls an operation of the magnetic head and reads data recorded in the magnetic tape 102.

Specifically, the data recording method realized by the data recording controller 152 is specified in the exemplary embodiment. Therefore the data recording method will now be described. As shown by FIG. 15, the data tracks 121 on the magnetic tape 102 are formed in a prescribed length along the running direction. More specially, a plurality of the data tracks 121 are formed between a plurality of servo tracks 123 which are formed along the running direction, and configure a data band 122. Here, enlarged view of part A which is a part of the data tracks 121 shown in FIG. 16 is shown in FIG. 17.

As shown FIG. 17, each data track of the magnetic tape 102 records divided data. Specifically, in the exemplary embodiment, the data recording controller 152 can control a writing operation in the same way as in RAID 5 which is a writing method of HDD. That is, the data recording controller 152 generates a plurality of divided data obtained by dividing recording target data and parity data which detects an error of the recording target data and controls an operation of the write heads 4 to record each divided data and parity data as one group in each track. In other words, the data recording controller 152 generate the parity data as redundant data of the recording target data and records the data. For example, as shown in FIG. 17, firstly, the data recording controller 152 divides the recording target data into data 1, 2, and 3 and generates its parity data. Then the data 1, 2 and 3 which is the divided data and parity data are recorded in tracks 1-4 respectively by using the write head of the magnetic head assembly 104. Therefore, data of one group which has a redundancy is recorded. That is, even if one track of one group cannot be read, the data can be restored by using the parity data by a function of the data reproducing controller 153 described later and redundancy can be kept. Further by recording with RAID 5 method, a recording capacity can be restrained.

Then the data reproducing controller 153 controls the read head embedded in the magnetic head assembly to read data from each track, as described above. At this time, in the case where read error is detected, the data reproducing controller 153 corrects an error based on a set write method. That is, as shown in FIG. 17, if the data cannot be read from a part of the track in RAID 5, the data is restored by another data of the same group. Then, it is informed the host computer H that is error correction is performed, if necessary.

Although we have explain about recording the data with RAID 5 in above exemplary embodiment, the linear-type magnetic tape device of the exemplary embodiment can record data in RAID 1 as in the first exemplary embodiment. In other word, the magnetic tape device can be configured as a redundant device by recording the recording data and their mirror data in the data recording areas which are separated with each other.

The magnetic tape device of the invention can be used in order to back up the data which are controlled by the server computer.

While the invention has been particularly shown and described with reference to exemplary embodiments thereof, the invention is not limit to these embodiments. It will be understood by those of ordinary skill in the art that carious changes in form and details may be therein without departing from the sprit and scope of the present invention as defined by the claims.

What is claimed is:

1. A magnetic tape device comprising:
a plurality of magnetic heads which records or reproduces data in a magnetic tape including a data recording area;
a tape running mechanism which makes the magnetic tape run on the magnetic heads; and
a controller which generates data for recording and records the data for recording in the data recording area, the data for recording including recording data and redundant data that are recorded in different tracks, wherein the redundant data are the same as the recording data, and the controller records the recording data and the redundant data in tracks with having one or more tracks interposed therebetween, and wherein the controller records the redundant data in a direction opposite to a direction of the recording data.

2. The magnetic tape device according to claim 1 wherein the redundant data is parity data detecting an error of the recording data.

3. The magnetic tape device according to claim 2 wherein the controller divides the recording data into a plurality of divided data, generates parity data of the divided data and records the divided data and the parity data as one group.

4. A magnetic tape device comprising:
a plurality of magnetic heads which records or reproduces data in a magnetic tape including a data recording area;
a tape running mechanism which makes the magnetic tape run on the magnetic heads; and
a controller which generates data for recording and records the data for recording in the data recording area, the data for recording including recording data and redundant data that are recorded in different tracks,
wherein the redundant data are used to correct data in each track, and
wherein the controller includes a recording controller to control the recording and reproducing operations of the magnetic heads so as to record recording target data and data which is the same as at least a part of the recording target data as redundant data, the recording target data and the redundant data not being recorded in recording areas adjacent with each other.

5. The magnetic tape device according to claim 4 wherein the recording controller controls the recording operation so as to record the recording target data and the redundant data in different tracks on the magnetic tape, the redundant data being obtained by giving redundancy to the recording target data.

6. The magnetic tape device according to claim 5 wherein the redundant data is the same as the recording target data.

7. The magnetic tape device according to claim 6 wherein the recording controller records the redundant data in a direction opposite to a recording direction of the recording target data on the magnetic tape.

8. The magnetic tape device according to claim 6 wherein the recording controller records the recording target data and the redundant data in each track separate apart with each other on the magnetic tape.

9. The magnetic tape device according to claim 5 wherein the redundant data is parity data to detect an error of the recording target data.

10. The magnetic tape device according to claim 9 wherein the recording controller records divided data of the recording target data and the parity data of the recording target data as one group in each truck.

11. The magnetic tape device according to claim 9 wherein the magnetic tape device records and reproduces the data in helical scanning method or linear recording method.

12. A data recording method for a magnetic tape device including a plurality of magnetic heads which records or reproduces data in a magnetic tape including a data recording area, a tape running mechanism which makes the magnetic tape run on the magnetic heads, and a controller which controls recording and reproducing operations of the magnetic heads for the magnetic tape while running, the method comprising:
generating data for recording, and recording the data for recording in the data recording area, the data for recording including recording data and redundant data that are recorded in different tracks,
wherein the recording step controls the recording operation so as to record the recording target data and the redundant data in different tracks on the magnetic tape, the redundant data being obtained by giving redundancy to the recording target data.

13. The data recording method according to claim 12 wherein the recording step records same data as the recording target data as the redundant data.

14. The data recording method according to claim 12 wherein the recording step records the recording target data in the magnetic tape and records the redundant data in a direction opposite to a recording direction of the recording target data on the magnetic tape.

15. The data recording method according to claim 12 wherein the recording step records the recording target data and the redundant data in each track spaced apart with each other on the magnetic tape.

16. The data recording method according to claim 12 wherein the recording step records parity data as the redundant data to detect an error of the recording target data.

* * * * *